(12) United States Patent
Chang et al.

(10) Patent No.: US 10,104,550 B2
(45) Date of Patent: Oct. 16, 2018

(54) INDUCTION TYPE ORNAMENT WITH PRIVATE MESSAGE TRANSMISSION

(71) Applicant: PORTWELL INC., New Taipei (TW)

(72) Inventors: Lin-Heng Chang, New Taipei (TW); Kuang-Hung Cheng, New Taipei (TW); Chih-Kae Guan, New Taipei (TW)

(73) Assignee: PORTWELL INC., New Taipei (TW)

( * ) Notice: Subject to any disclaimer, the term of this patent is extended or adjusted under 35 U.S.C. 154(b) by 176 days.

(21) Appl. No.: 15/363,349

(22) Filed: Nov. 29, 2016

(65) Prior Publication Data

US 2017/0318464 A1 Nov. 2, 2017

(30) Foreign Application Priority Data

Apr. 29, 2016 (TW) ............... 105206181 U (51) Int. Cl.
*H04W 12/08* (2009.01)
*H04B 5/00* (2006.01)
*H04L 29/06* (2006.01)
*H04W 12/06* (2009.01)

(52) U.S. Cl.
CPC ......... *H04W 12/08* (2013.01); *H04B 5/0031* (2013.01); *H04B 5/0056* (2013.01); *H04L 63/083* (2013.01); *H04L 63/10* (2013.01); *H04W 12/06* (2013.01)

(58) Field of Classification Search
CPC ...... H04W 12/06; H04W 12/08; H04L 63/10; H04L 63/083; H04B 5/0031; H04B 5/0056
See application file for complete search history.

(56) References Cited

U.S. PATENT DOCUMENTS

| 5,487,925 A * | 1/1996 | Simmel ............. A47G 33/0809 428/10 |
| 2011/0194276 A1* | 8/2011 | Au .................... A44C 15/0015 362/104 |
| 2015/0206046 A1* | 7/2015 | Aibazov ............. H01Q 1/2225 235/492 |
| 2015/0254722 A1 | 9/2015 | Lee et al. |
| 2015/0281628 A1* | 10/2015 | Lev ................... H04N 1/00244 348/838 |

* cited by examiner

*Primary Examiner* — Beemnet W Dada (57) ABSTRACT

An induction type ornament with private message transmission includes: an ornament; an electronic tag installed to the ornament and having an NFC chip and an NFC coil; a private message stored in the electronic tag or a cloud server; so that when a recipient uses a mobile induction device to read the electronic tag from the ornament given by a giver, the recipient can read the private message which is pre-recorded and stored in the electronic tag or the cloud server, so as to provide significance, uniqueness, and the effect of transmitting private messages to the ornament or a gift and the ornament or gift provides the convenience of receiving and displaying a message to improve the using value of the ornament or gift.

12 Claims, 7 Drawing Sheets

INDUCTION TYPE ORNAMENT WITH PRIVATE MESSAGE TRANSMISSION

FIELD OF THE INVENTION

The present invention relates to an ornament, more particularly to an induction type ornament with private message transmission and capable of performing a private message communication with a mobile induction device conveniently and providing excellent significance to ornament.

BACKGROUND OF THE INVENTION

Description of the Related Art

In the situation of the fast commercial and industrial development, there are various different types; and the present close social development results in a closer interpersonal communication, and ornaments, presents, and gifts have become a part of our life to express our affection between families, relatives, lovers, friends, etc or to send gifts by manufacturers, companies, and organizations. People nowadays have the habit of travelling to different places, and a souvenir with local features and landscape or commemorative value is an optional item and gift for friends and relatives. The frequent activities of sending ornaments/gifts of this sort drive us to think of a way of sending an ornament or a gift with meaningful features.

In addition, the present Near Field Communication (NFC) technology has been applied for transmitting data between electronic devices, and these applications include making payments by IC cards (such as credit cards), IPASS, door security control, ticket, etc. Since the NFC technology makes use of contacting an RF region of a card reader to supply power, therefore one having the card can work even in the condition of having no electric power. If the NFC technology is combined with the aforementioned ornaments or gifts, and a portable electronic device (such as a mobile phone, a flat PC, and a smart wearable device) is used for receiving and displaying data, then a private message communication with significance and uniqueness between the giver and recipient will be possible. For example, when the recipient has received an ornament or gift, the recipient can read a private message or a text, a photo, a movie, etc related to a tour recorded by the giver directly from a mobile phone at hand.

In addition, when an ornament or gift is integrated with the NFC technology, and an electronic device is used for transmitting messages, there is an issue of privacy or security. In other words, other persons may use a mobile phone of a person other than the ornament or gift owner to receive the information stored in the flat PC and display the information, and it is necessary to protect the privacy. Therefore, it is an important research and development subject for related manufacturers to overcome or compensate the conventional ornament or gift without the effect of communicating messages or protecting related privacy and security.

In view of the drawbacks and imperfect design of the conventional ornament or gift, the inventor of the present invention developed an induction type ornament with private message transmission with better significance, uniqueness, convenience and security.

SUMMARY OF THE INVENTION

Therefore, it is a primary objective of the present invention to provide an induction type ornament with private message transmission, and the ornament is capable of transmitting a message with significance and uniqueness, and providing the convenience of displaying the message to improve the value of using the ornament and gift.

Another further objective of the present invention is to provide an induction type ornament with private message transmission capable of using an ornament or gift to transmit a text, a sound, a video clip, a picture, and an URL address, and the giver may connect to a cloud device by the URL address to update the content of the message repeatedly.

Another objective of the present invention is to provide an induction type ornament with private message transmission, and the ornament is capable of protecting the confidentiality of a message transmitted through a transmission channel of the ornament or gift, preventing unauthorized persons from receiving and reading the message, so as to protect the privacy and security much better.

To achieve the aforementioned and other objectives of the present invention, the technical measure adopted by the invention comprises: an ornament; an electronic tag, installed to the ornament, and comprising an NFC chip and an NFC coil; and a private message, stored in the electronic tag; such that when a recipient uses the mobile induction device to read the electronic tag from an ornament given by a giver, the recipient can read the private message pre-recorded and stored in the electronic tag by the giver.

The electronic tag further comprises a private authentication module, and the private authentication module requiring a password inputted from the mobile induction device and a correct authentication of the password before the content of the electronic tag including the private message can be read. The electronic tag further comprises a private authentication module, and the private authentication module requires a password inputted from the mobile induction device and a correct authentication of the password before the content of the electronic tag including the private message can be read.

The mobile induction device comprises a control unit, and an NFC reading unit, a display unit, and a communication unit which are electrically coupled to the control unit.

Wherein, the electronic tag further comprises a private authentication module, and the private authentication module requires a password inputted from the mobile induction device and a correct authentication before the content of the electronic tag including the private message can be read.

To achieve the aforementioned and other objectives of the present invention, another technical measure adopted by the invention comprises: an ornament; an electronic tag, installed to the ornament, and comprising an NFC chip and an NFC coil; a private message, stored in a cloud server, and corresponsive to the access authentication data of the electronic tag of the ornament, so that the recipient can use a mobile induction device to sense the URL address of the electronic tag and connect to the cloud server to read the private message pre-recorded and stored to the cloud server by the giver.

The mobile induction device comprises a control unit, and an NFC reading unit, a display unit, and a communication unit, which are electrically coupled to the control unit.

Wherein, the mobile induction device is connected to a cloud server by the communication unit.

Wherein, the cloud server further includes a private authentication module for receiving and authenticating a password transmitted from the mobile induction device.

Wherein, the cloud server further includes a product authentication module for receiving and authenticating an authentication code transmitted from the mobile induction device.

Wherein, the communication unit is a WIFI module or a mobile Internet module such as a 3G or 4G mobile Internet module.

Wherein, the private message includes a text, a sound, a video clip, a picture or at least one URL address.

Wherein, the cloud server further includes product information stored therein and corresponsive to access authentication data of the electronic tag of the ornament.

Wherein, the product information includes a text, a sound, a video clip, a picture, or at least one URL address.

Wherein, the URL address is connected to a specific website.

Wherein, the mobile induction device further includes an input/output unit.

Wherein, the display unit is a touch screen.

DESCRIPTION OF THE PREFERRED EMBODIMENTS

The above and other objects, features and advantages of this disclosure will become apparent from the following detailed description taken with the accompanying drawings.

Figure 1:
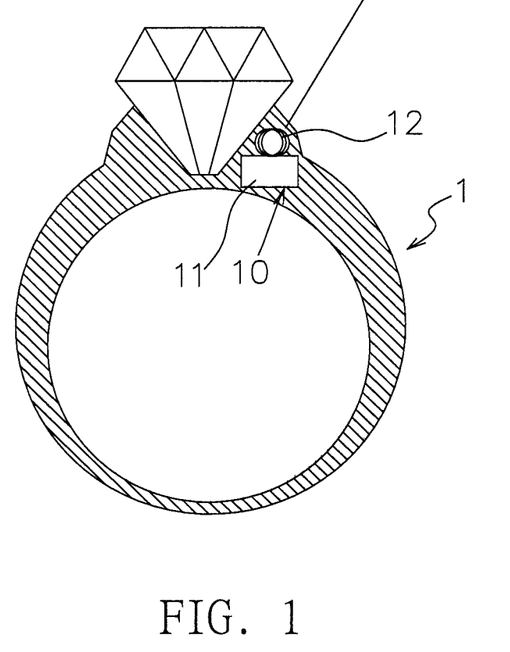
FIG. 1 is a first schematic view of an ornament of the present invention.
Figure 2:
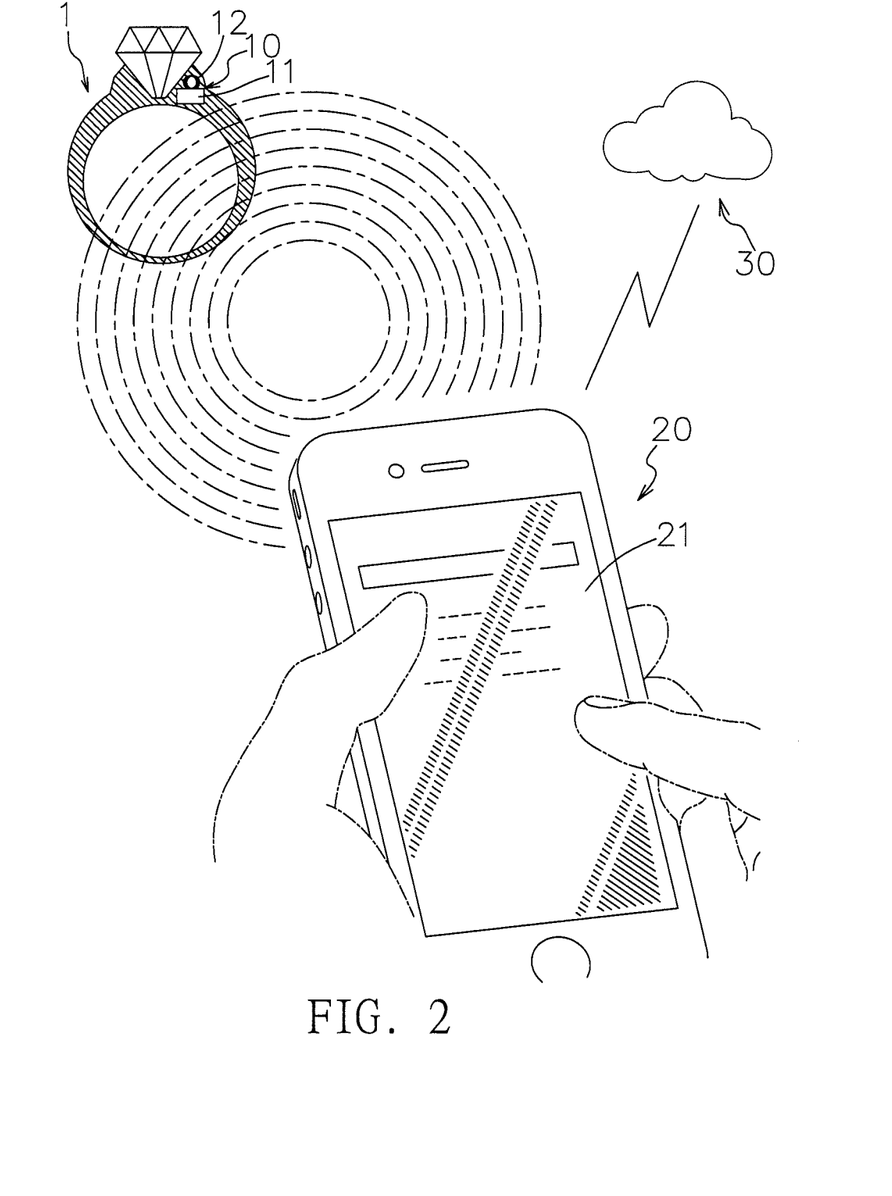
FIG. 2 is a schematic view of an application of the present invention.

With reference to FIGS. 1 and 2 for an induction type ornament with private message transmission in accordance with the present invention, these figures are provided for the purpose of illustrating the present invention, but not intended for limiting the scope of the invention. It is noteworthy that the drawings are not necessarily drawn according to the actual shape, size, and proportion.

Figure 1A:
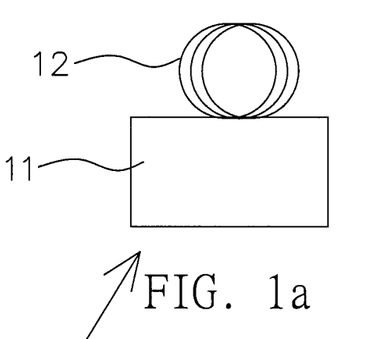
FIG. 1a is a partial blowup view of FIG. 1.
Figure 3:
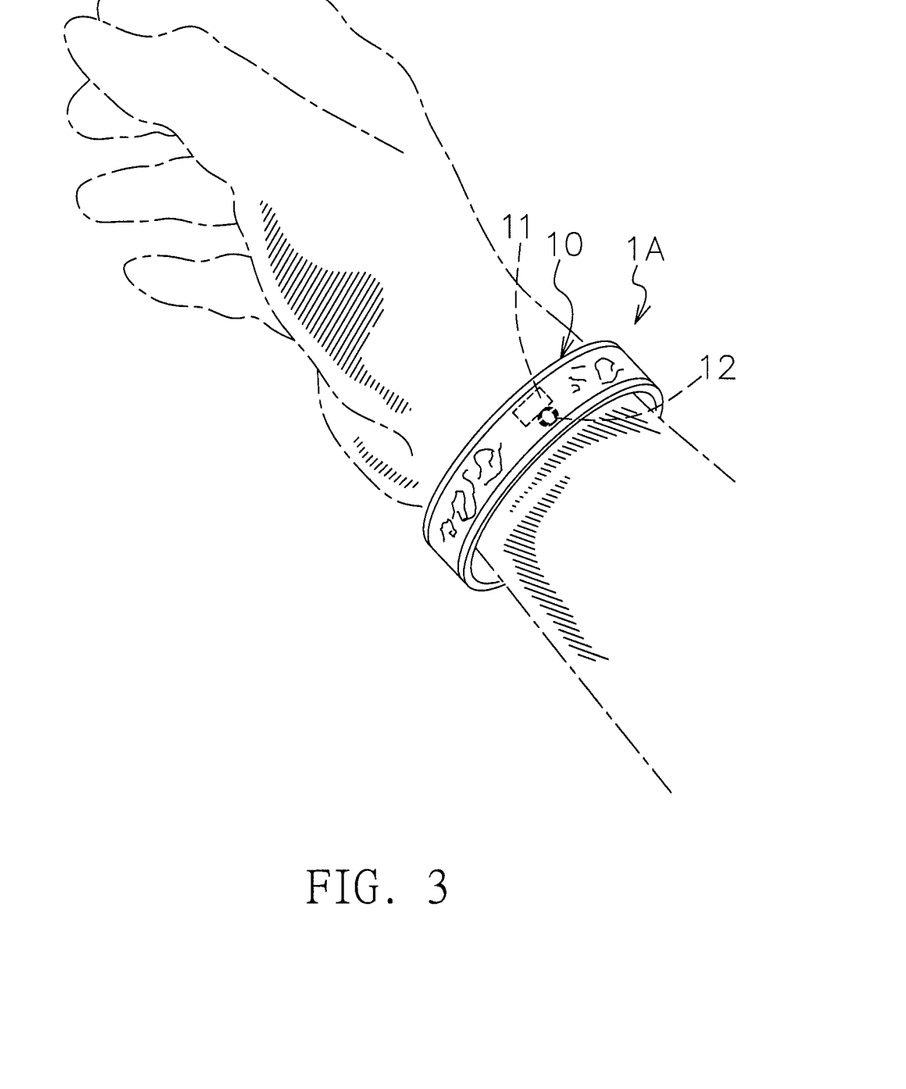
FIG. 3 is a second schematic view of an ornament of the present invention.

The induction type ornament with private message transmission of the present invention comprises: an ornament 1, which is a ring, but the ornament 1 may be any other ornament such as a piece of jewelry, a necklace, a bracelet, a string of beads, a pendant, etc. In FIG. 3, the ornament 1A is a bracelet. The ornament 1(1A) has an electronic tag 10 (or an NFC tag), and the electronic tag 10 comprises an NFC chip 11 and an NFC coil 12.

Figure 4:
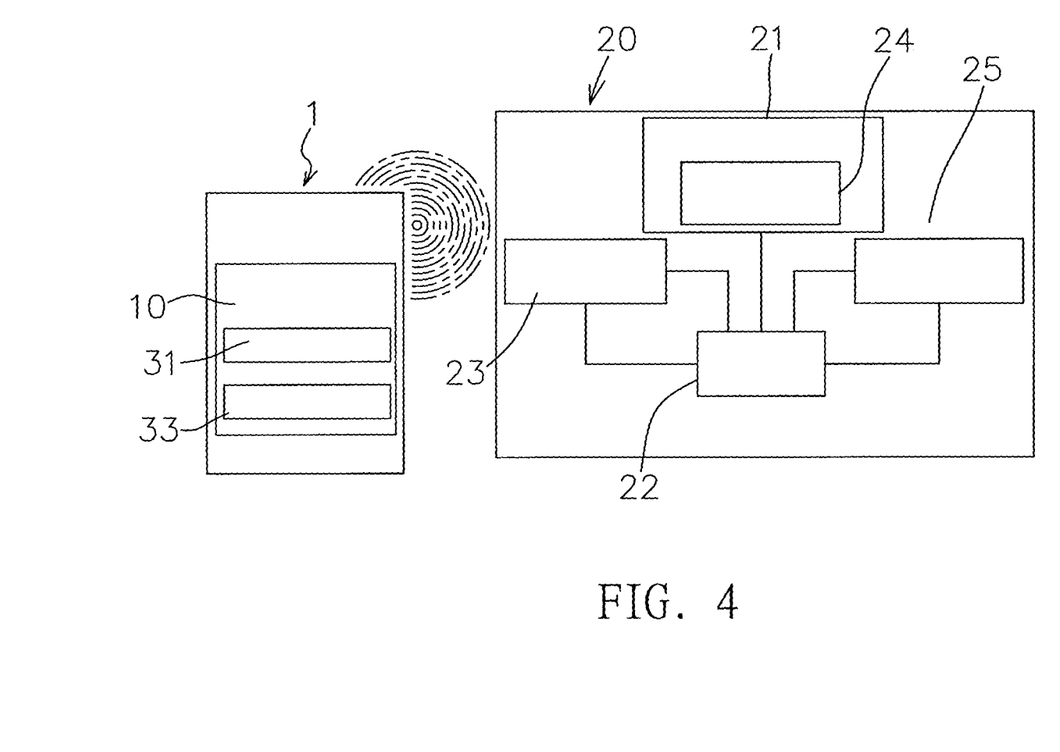
FIG. 4 is a schematic view of a first embodiment of the present invention.

With reference to FIG. 4 for a mobile induction device 20 of the first embodiment of the present invention, the mobile induction device 20 is a smart phone (or a flat PC, a smart wearable device, etc), and the mobile induction device 20 has a display unit 21.

The mobile induction device 20 is an induction device for performing an inductive transmission to the electronic tag 10, and the mobile induction device 20 comprises a display unit 21, a control unit 22, an NFC reading unit 23, an input/output unit 24, and a communication unit 25, wherein the display unit 21, the NFC reading unit 23, the input/output unit 24 and the communication unit 25 are electrically coupled to the control unit 22, and the display unit 21 is a touch screen; and the communication unit 25 is a WIFI module or a mobile Internet module such as a 3G or 4G mobile Internet module.

In addition, a private message is stored in the electronic tag, such that when the recipient uses the mobile induction device 20 to read an electronic tag of an ornament given by the giver, the recipient can read the private message of the NFC chip 11 pre-recorded and stored in the electronic tag by the giver, and thus the ornament or give has the effects of transmitting messages with significance and uniqueness and providing the convenience of displaying the messages, so as to improve the use value of the ornament or gift.

Wherein, the electronic tag further comprises a private authentication module 33, and the private authentication module 33 requires a password inputted from the mobile induction device 20 and a correct authentication before the content of the electronic tag including the private message 31 can be read, so as to protect the privacy and security of the private message.

Figure 5:
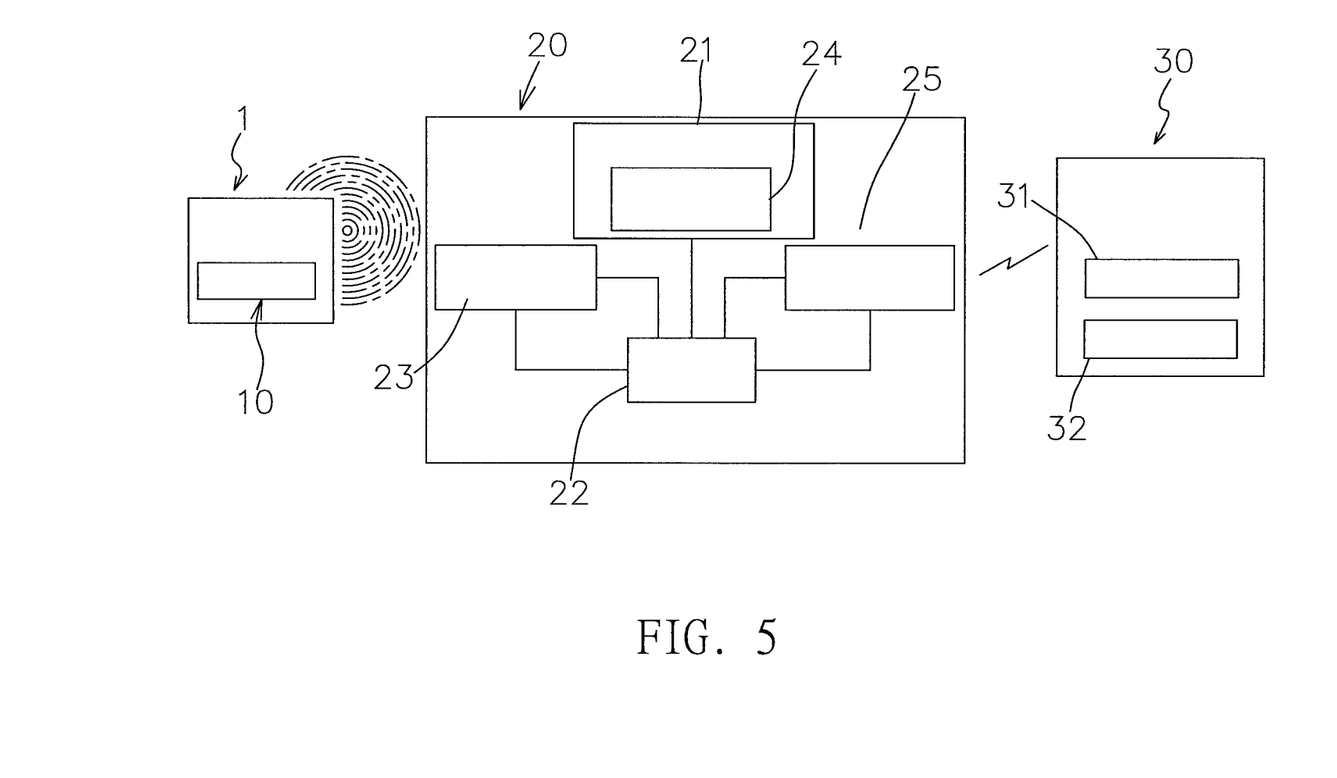
FIG. 5 is a schematic view of a second embodiment of the present invention.

With reference to FIG. 5 for an induction type ornament with private message transmission in accordance with the second preferred embodiment of the present invention, this embodiment is modified according to the basic structure of the first preferred embodiment, wherein a private message 31 is stored in a cloud server 30, and the cloud server 30 and the mobile induction device 20 may transmit and exchange data via a wireless transmission, and the cloud server 30 includes at least one private message 31 stored therein and corresponsive to the access authentication data of the electronic tag 10 of the ornament 1(1A), and the private message 31 to be transmitted by the giver may be a text, a sound, a video clip, a picture, or an URL address. After the private message 31 is selected and inputted, the private message is integrated and uploaded to the cloud server 30. The cloud server 30 further includes product information 32 stored therein and corresponsive to the access authentication data of the electronic tag 10 of the ornament 1(1A), and the product information 32 is a text, a sound, a video clip, a picture, or an URL address, and the product information is used for transmitting related messages including product description, how-to-use information, warranty, and after-sale service that a manufacturer would like to tell the product owner.

In an application of the induction type ornament with private message transmission in accordance with the present invention, after the giver buys the ornament 1(1A), the giver may use a mobile induction device to input a private message 31 such as a text, a sound, a video clip, a picture, or an URL address pre-stored in to the electronic tag 10, or after the ornament 1(1A) is manufactured, the manufacturer inputs product information 32 such as a text, a sound, a video clip, a picture, or an URL address pre-recorded in the electronic tag 10. The URL address is connected to a specific website, wherein the specific website has a private message 31 or product information 32 such as a pre-stored text, sound, video clip, and picture, and the cloud server 30 may include a private message 31 or product information 32 such as a text, sound, video clip, or picture, and the information stored in the specific website or the cloud server 30 may be updated or supplemented at a later day.

After the recipient has received the ornament 1(1A), the recipient may put a mobile induction device 20 near the ornament 1(1A) to sense the electronic tag 10 of the ornament 1(1A) by means of the NFC reading unit 23 of the mobile induction device 20 and read the private message 31 or product information 32 such as a text, a sound, a video clip, a picture, etc, and the content is displayed by the display unit 21, or a sound is produced by the mobile induction device 20. The recipient may also put the mobile induction device 20 near the ornament 1(1A) to sense the specific website (URL address) or the cloud server 30 through the mobile induction device 20 to read the private message 31 or product information 32 such as a text, a sound, a video clip, and a picture stored in the specific website or cloud server 30, and the content is displayed by the display unit 21 or sound is produced by the mobile induction device 20.

Figure 6:
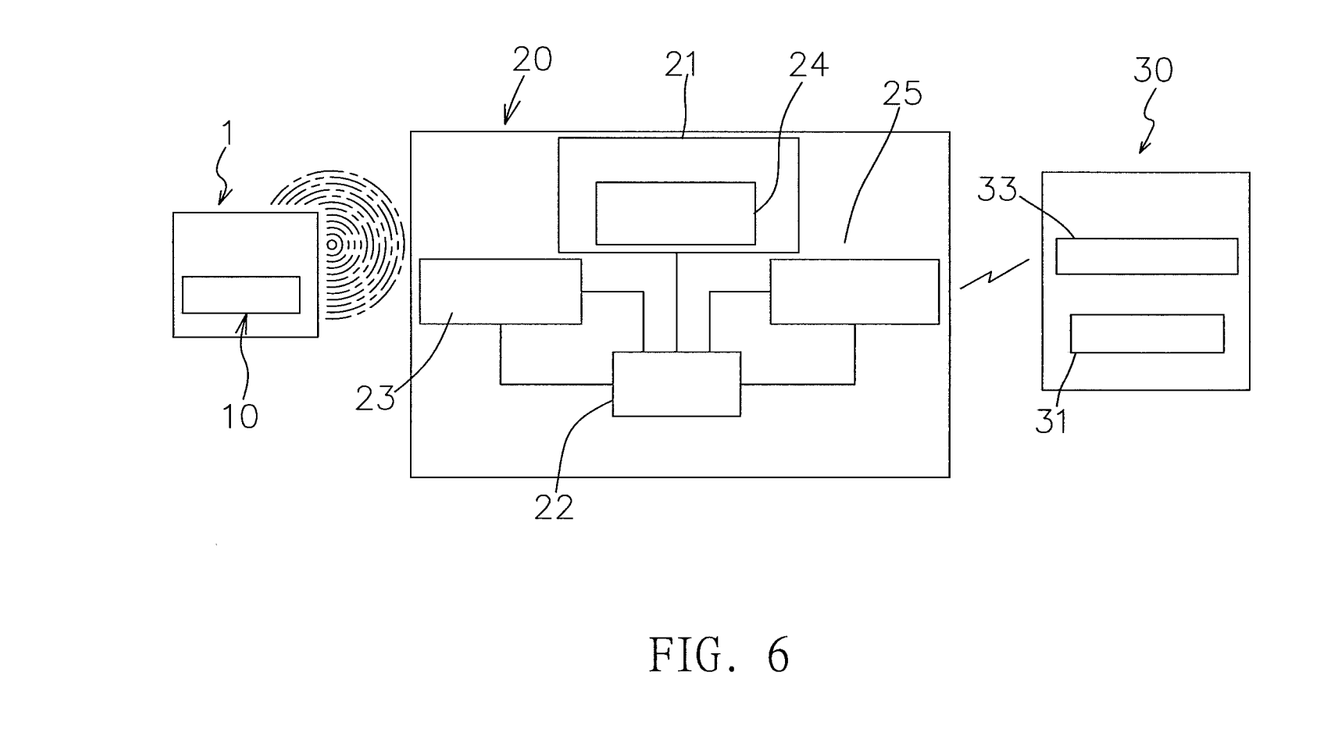
FIG. 6 is a schematic view of a third embodiment of the present invention.

With reference to FIG. 6 for an induction type ornament with private message transmission in accordance with the third preferred embodiment of the present invention, this embodiment is modified according to the basic structure of the first preferred embodiment, wherein this embodiment also comprises the ornament 1(1A), the electronic tag 10 and the mobile induction device 20 (further comprising the display unit 21, the control unit 22, the NFC reading unit 23, the input/output unit 24 and the communication unit 25), and the difference between the first and second embodiments resides on that the cloud server 30 includes a private message 31 and a private authentication module 33. A password is transmitted from the mobile induction device 20 and verified to be correct by the private authentication module 33 before the content of the cloud server 30 including the private message 31 can be read. When the recipient puts the mobile induction device 20 near the ornament 1(1A), the recipient needs to enter a password to be transmitted to the cloud server 30, before the content of the cloud server 30 can be read, and thus the invention can protect privacy and security.

Figure 7:
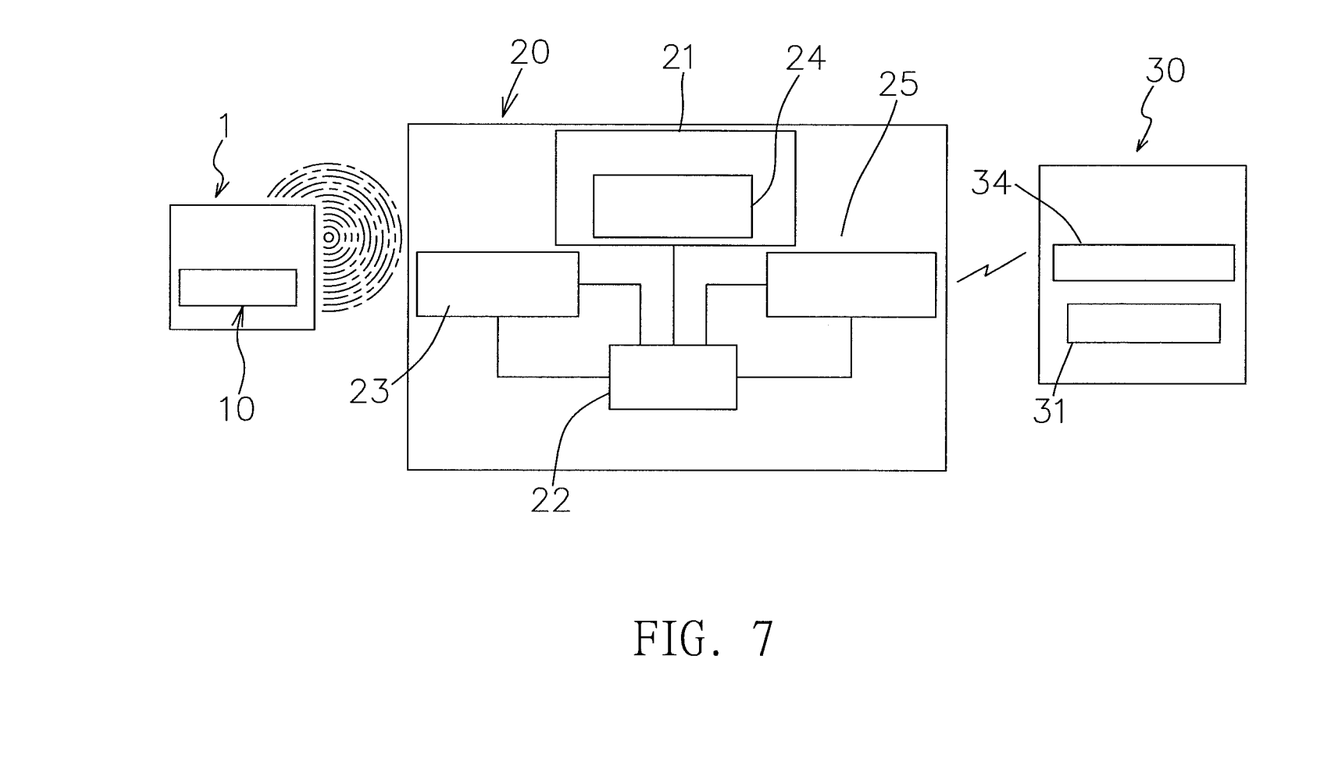
FIG. 7 is a schematic view of a fourth embodiment of the present invention.

With reference to FIG. 7 for an induction type ornament with private message transmission in accordance with the third preferred embodiment of the present invention, this embodiment is modified according to the basic structure of the second preferred embodiment, wherein the embodiment also comprises the ornament 1(1A), the electronic tag 10 and the mobile induction device 20 (further comprising the display unit 21, the control unit 22, the NFC reading unit 23, the input/output unit 24 and the communication unit 25), and the difference between the second and third embodiments resides on that the cloud server 30 includes a private message 31 and a product authentication module 34; and the product authentication module 34 requires a correct authentication code transmitted from the mobile induction device 20 before the contents of the cloud server 30 such as the related messages provided by the manufacturer or the private message 31 can be read. When the recipient puts the mobile induction device 20 near the ornament 1(1A), the recipient further needs to enter an authentication code to be transmitted to the cloud server 30 before the content of the cloud server 30 can be read, and the authentication code can be used for determining whether or not the ornament or gift is an authorized manufactured product, and such application has the effect of preventing some limited, high-price, or commemorative products from being forged or copied effectively.

In summation, the induction type ornament with private message transmission of the present invention gives significance and uniqueness to the ornament or gift and provides the convenience of receiving and displaying the message to improve the use value of the ornament or gift. In addition, the invention can update the message repeated by connecting the URL address to the cloud device, and can also protect the confidentiality of the message transmitted via the channel of the ornament or gift, so as to prevent unauthorized persons from receiving or reading the message and protect the privacy and security better.

While the invention has been described by means of specific embodiments, numerous modifications and variations could be made thereto by those skilled in the art without departing from the scope and spirit of the invention set forth in the claims.

What is claimed is:

1. An induction type ornament with private message transmission, and capable of performing an inductive transmission with a mobile induction device having a control unit, a display unit, an NFC reading unit and a communication unit which are installed in and electrically coupled to the mobile induction device, comprising:
   an ornament;
   an electronic tag, installed on the ornament comprising an NFC chip and an NFC coil;
   a private message stored in the NFC chip;
   wherein the ornament is given by a giver to a recipient;
   wherein when the recipient uses the mobile induction device to read the electronic tag from the ornament, the recipient can read the private message pre-recorded and stored in the electronic tag by the giver; and
   the electronic tag further comprising a private authentication module, wherein the private authentication module requiring a password inputted from the mobile induction device and a correct authentication of the password before the content of the electronic tag including the private message can be read.

2. An induction type ornament with private message transmission, capable of performing an inductive transmission with a mobile induction device having a control unit, a display unit, an NFC reading unit, and a communication unit which are installed in and electrically coupled to the mobile induction device, comprising:
   an ornament;
   an electronic tag, installed on the ornament comprising an NFC chip, an NFC coil and access authentication data;
   a private message stored in a cloud server corresponding to the access authentication data of the electronic tag
   wherein the cloud server and the mobile induction device transmitting and exchanging data with each other via a wireless transmission;
   wherein the ornament is given by a giver to a recipient;
   wherein when the recipient uses the mobile induction device to read the electronic tag from the ornament the recipient can read the private message pre-stored in the cloud server by the giver.

3. The induction type ornament with private message transmission according to claim 2, wherein the cloud server further includes a private authentication module for receiving and authenticating a password transmitted from the mobile induction device.

4. The induction type ornament with private message transmission according to claim 2, wherein the cloud server further includes a product authentication module for receiving and authenticating an authentication code transmitted from the mobile induction device.

5. The induction type ornament with private message transmission according to claim 2, wherein the communication unit is a WIFI module or a mobile Internet module, including a 3G or a 4G mobile Internet module.

6. The induction type ornament with private message transmission according to claim 2, wherein the private message includes a text, a sound, a video clip, a picture, or at least one URL address.

7. The induction type ornament with private message transmission according to claim 2, wherein the cloud server further includes product information stored therein and corresponsive to access authentication data of the electronic tag of the ornament.

8. The induction type ornament with private message transmission according to claim 7, wherein the product information includes a text, a sound, a video clip, a picture, or at least one URL address.

9. The induction type ornament with private message transmission according to claim 6, wherein the URL address is connected to a specific website.

10. The induction type ornament with private message transmission according to claim 8, wherein the URL address is connected to a specific website.

11. The induction type ornament with private message transmission according to claim 2, wherein the mobile induction device further includes an input/output unit.

12. The induction type ornament with private message transmission according to claim 2, wherein the display unit is a touch screen.

* * * * *